Patented May 20, 1947

2,420,801

UNITED STATES PATENT OFFICE 2,420,801

PROCESSES FOR PRODUCTION OF HEXACHLORETHANE

George B. Stratton, Niagara Falls, N. Y., assignor to Hooker Electrochemical Company, Niagara Falls, N. Y., a corporation of New York No Drawing. Application September 2, 1943, Serial No. 500,997

4 Claims. (Cl. 204—163)

My invention relates more particularly to production of hexachlorethane by chlorination of tetrachlorethylene. Tetrachlorethylene boils under atmospheric pressure at about 121° C. Hexachlorethane cannot exist in liquid form under atmospheric pressure. At about 185° C. it passes directly from the solid to the gaseous state. For this reason in chlorinating tetrachlorethylene it has heretofore been customary to recover the product by stages. The tetrachlorethylene is chlorinated until a slurry of hexachlorethane appears in the reactor. The whole mass is then chilled and the hexachlorethane thus crystallized out is removed by centrifuging. The mother liquor is recycled to the reactor, where more tetrachlorethylene is added and the process repeated. This involves not only a large investment in chillers, crystallizers, centrifugal separators and transfer apparatus, but also heavy expense for labor and for cooling the same tetrachlorethylene several times before it is all converted to hexachlorethane.

I have now discovered that if, instead of stopping the reaction part way and removing the product, the exits from the reactor be closed and heat applied the increasing temperature builds up the pressure in the reactor past the triple point of the hexachlorethane and the reaction can then be carried out in liquid phase and thus to completion in a continuous operation. I am thereby able to effect a great simplification in apparatus and technique and saving in labor.

Example

Into a 100-gallon enamelled and jacketed tank, provided with an inlet and discharge pipe extending to near the bottom, a vent, safety valve, pressure gauge and thermometer well, and a light well equipped with two 250 watt mercury vapor lamps, 60 to 75 gallons of tetrachlorethylene are charged at room temperature. As oxygen inhibits the reaction of chlorine with tetrachlorethylene, the air in the space above the liquid in the reactor, as well as in the chlorine inlet pipe, is displaced by blowing in CO₂. Although the reaction will start at room temperature, I prefer to preheat to 60° to 100° C. With the vent closed, chlorine is then admitted through the inlet pipe beneath the surface at such a rate that it is substantially all absorbed. In the reaction of chlorine with tetrachlorethylene there is no substitution of chlorine for hydrogen and hence no formation of hydrogen chloride, except for minor traces due to impurities. As the reaction proceeds, the temperature is held at 100° to 110° C. by circulating heat transfer liquid through the jacket and an external cooler. On account of such traces of hydrogen chloride and the increase in volume of the liquid itself, the pressure builds up and is vented off from time to time whenever necessary to keep it within a safe limit, without however allowing it to fall to a pressure at which the reaction mixture would vaporize to any considerable extent. The chlorine entering the reactor is measured by weighing or by means of a flow-meter. When about one quarter to one half, and preferably one third, of the theoretical quantity of chlorine has been introduced, the further admission of chlorine and the concentration and temperature of the heat transfer liquid are regulated so as to permit the reaction temperature to start rising again. The increase in temperature is co-ordinated with the progress of the reaction so as to prevent formation of crystals of hexachlorethane in the reaction mixture. When the temperature has reached approximately 150° C. the cooler is by-passed and, with the heat transfer liquid still circulating, external heat is applied to the jacket, as by means of a gas burner. In this way the temperature of the liquid within the reactor is raised to 190° or 220° C. A pressure of 10 to 35 lbs. per sq. in. gauge is thereby built up in the reactor, depending upon the quantity of unreacted tetrachlorethylene present. Under these conditions the product, notwithstanding its high vapor pressure, remains liquid, and the reaction goes to completion in liquid phase, as follows:

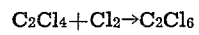

$$C_2Cl_4 + Cl_2 \rightarrow C_2Cl_6$$

This entire operation requires four to six hours and the yield, based upon the tetrachlorethylene, averages close to theory. The pressure may then be increased to 40 or 45 lbs., if necessary by admission of more carbon dioxide, and the liquid product, substantially free from unreacted tetrachlorethylene, is sprayed into a cooling chamber, where it is purified and condensed to a friable, freely flowing crystalline form, as described and claimed in copending application Serial No. 501,006, filed simultaneously herewith, now Patent No. 2,385,475, September 25, 1945.

During the transfer of the product to the cooler, more carbon dioxide may be admitted to maintain the pressure. The transfer pipes are preferably jacketed and the heat transfer liquid circulated through their jackets. For this heat transfer liquid I prefer to use alphachlornaphthalene. If desired pressure responsive valves may be provided in the chlorine and carbon dioxide inlet pipes to shut off the admission of these gases if the pressure in the reactor should rise too high. In place of carbon dioxide any other gas inert with respect to the reaction, such as hydrogen chloride or nitrogen, may be used.

I claim:

1. The process for production of hexachlorethane which comprises charging tetrachlorethylene into a vented pressure-type reactor to somewhat less than the full capacity thereof; displacing the air from above the liquid by means of a gas inert to the reaction; passing gaseous chlorine into the liquid under light of a quality effective in catalyzing the reaction, at a rate at which the chlorine is substantially all absorbed, with cooling to maintain the reaction mixture at 100° to 110° C. and venting off of excessive pressure due to expansion of the liquid or chlorination of impurities, without however permitting any considerable vaporization of the reaction mixture, until one fourth to one half of the theoretical quantity of chlorine for completion of the reaction has been admitted; thereupon regulating the cooling and further admission of chlorine to permit the temperature to rise with the progress of the reaction, and thus prevent formation of crystalline hexachlorethane in the reaction mixture, until the temperature has risen as far as practicable from the heat of reaction; thereupon supplying external heat and regulating the further admission of chlorine to cause the temperature to rise to between 190° and 220° C. and pressure to build up in the closed reactor, at least to the corresponding vapor pressure; and so carrying the reaction to substantial completion in liquid phase.

2. The process for production of hexachlorethane which comprises charging tetrachlorethylene into a vented pressure-type reactor to somewhat less than the full capacity thereof; displacing the air from above the liquid by means of a gas of the group consisting of carbon dioxide, hydrogen-chloride and nitrogen; passing gaseous chlorine into the liquid under light of a quality effective in catalyzing the reaction, at a rate at which the chlorine is substantially all absorbed, with cooling to maintain the reaction mixture at 100° to 110° C. and venting off of excessive pressure due to expansion of the liquid or chlorination of impurities, without however permitting any considerable vaporization of the reaction mixture, until one fourth to one half of the theoretical quantity of chlorine for completion of the reaction has been admitted; thereupon regulating the cooling and further admission of chlorine to permit the temperature to rise with the progress of the reaction, and thus prevent formation of crystalline hexachlorethane in the reaction mixture, until the temperature has risen as far as practicable from the heat of reaction; thereupon supplying external heat and regulating the further admission of chlorine to cause the temperature to rise to between 190° to 220° C. and pressure to build up in the closed reactor at least to the corresponding vapor pressure; and so carrying the reaction to substantial completion in liquid phase.

3. The process for production of hexachlorethane which comprises charging tetrachlorethylene into a vented pressure-type reactor to somewhat less than the full capacity thereof; displacing the air from above the liquid by means of a gas inert to the reaction; passing gaseous chlorine into the liquid under light of a quality effective in catalyzing the reaction, at a rate at which the chlorine is substantially all absorbed, with cooling to maintain the reaction mixture at 100° to 110° C. and venting off of excessive pressure due to expansion of the liquid or chlorination of impurities, without however permitting any considerable vaporization of the reaction mixture, until one fourth to one half of the theoretical quantity of chlorine for completion of the reaction has been admitted; thereupon regulating the cooling and further admission of chlorine to permit the temperature to rise with the progress of the reaction, and thus prevent formation of crystalline hexachlorethane in the reaction mixture, until the temperature has reached substantially 150° C.; thereupon supplying external heat and regulating the further admission of chlorine to cause the temperature to rise to between 190° and 220° C. and pressure to build up in the closed reactor at least to the corresponding vapor pressure; and so carrying the reaction to substantial completion in liquid phase.

4. The process for production of hexachlorethane which comprises charging tetrachlorethylene into a vented pressure-type reactor to somewhat less than the full capactiy thereof; displacing the air from above the liquid by means of a gas inert to the reaction; passing gaseous chlorine into the liquid under light of a quality effective in catalyzing the reaction, at a rate at which the chlorine is substantially all absorbed, with cooling to maintain the reaction mixture at 100° to 110° C. and venting off of excessive pressure due to expansion of the liquid or chlorination of impurities, without however permitting any considerable vaporization of the reaction mixture, until one fourth to one half of the theoretical quantity of chlorine for completion of the reaction has been admitted; thereupon regulating the cooling and further admission of chlorine to permit the temperature to rise with the progress of the reaction, and thus prevent formation of crystalline hexachlorethane in the reaction mixture, until the temperature has risen as far as practicable from the heat of reaction; thereupon supplying external heat and regulating the further admission of chlorine to cause the temperature to rise to between 190° and 220° C. and pressure to build up in the closed reactor to between 10 lbs. and 35 lbs. per sq. in. gauge; and so carrying the reaction to substantial completion and liquid phase.

GEORGE B. STRATTON.

REFERENCES CITED

The following references are of record in the file of this patent:

UNITED STATES PATENTS

| Number | Name | Date |
|---|---|---|
| 1,930,350 | Strosacker et al. | Oct. 10, 1933 |

OTHER REFERENCES

Journal American Chemical Society, volume 56, pages 1473–5, (1934), article by Dickinson et al.

Chemical Abstracts, volume 27, page 906, (1933).

Abstract of article by Leermakers et al. in Journal Chemical Society, volume 54, pages 4648–57, (1932).